SUBSCRIBER-LOOP CARRIER TELEPHONE RINGING SYSTEMS

Filed Feb. 28, 1955 3 Sheets-Sheet 1

INVENTORS L. HOCHGRAF
W. KOENIG, JR.

BY R. B. Ardis

ATTORNEY

INVENTORS L. HOCHGRAF
W. KOENIG, JR.

BY R. B. Ardis

ATTORNEY

INVENTORS L. HOCHGRAF
W. KOENIG, JR.
BY R. B. Ardis
ATTORNEY

United States Patent Office 2,837,605

Patented June 3, 1958

2,837,605

SUBSCRIBER-LOOP CARRIER TELEPHONE RINGING SYSTEMS

Lester Hochgraf, Madison, and Walter Koenig, Jr., Clifton, N. J., assignors to Bell Telephone Laboratories, Incorporated, New York, N. Y., a corporation of New York Application February 28, 1955, Serial No. 490,976

8 Claims. (Cl. 179—84)

This invention relates generally to telephone subscriber ringing and more particularly, although in its broader aspects not exclusively, to the transmission of ringing signals to individual subscribers from the central office in a rural carrier telephone system.

A principal object of the invention is to simplify the circuit arrangements needed for transmitting subscriber ringing information over the line when transmission is on a carrier frequency basis.

Another and more particular object is to transmit subscriber ringing information over a carrier line in as simple a manner as possible at a power level many times less than that required to accomplish actual ringing at the subscriber station sets.

Still another object is to avoid any necessity for using relays or other switching devices in transmitting ringing information from a central office to a subscriber station over a carrier line.

The subscriber ringing signals generated at a telephone central office are generally in the form of short spurts of relatively low frequency (e. g., 20 cycle) A. C. at a voltage level (80 to 90 volts) many times higher than the level of the transmitted voice signals (1 or 2 volts). In voice-frequency transmission systems, these spurts of low frequency A.-C. are transmitted over the line directly and serve to actuate the ringer of the called subscriber's telephone or station set. In the past, when calls were distributed from the central office to the subscribers on a carrier rather than a voice frequency basis (e. g., in a rural or subscriber-loop carrier telephone system), switching circuits including relays or other switching devices were usually provided at the central office to convert ringing signals into respective successions of carrier pulses having repetition rates comparable to the central office ringing signal frequency or to steady signals at frequencies different from the carrier frequency. These pulses or steady signals were transmitted over the carrier line and utilized at the subscribed terminal to accomplish subscriber ringing. The switching circuits used in the prior art to convert applied central office ringing signals to successions of carrier pulses or steady signals, however, tended to be rather complex and bulky and to require greater maintenance attention than circuits that contain fewer mechanical switching elements. The importance of the several disadvantages involved in the use of these prior art arrangements has been greatly increased since the development of transistors as active gain-producing devices and their application to the carrier telephone field. Small size and reduced maintenance requirements are particular advantages which may be realized through the use of transistors and which would be largely counterbalanced by the use of switching circuits for generating ringing pulses of carrier or steady signals of different frequencies in response to applied low frequency A.-C. ringing signals in the manner taught by the prior art.

The present invention overcomes these disadvantages of the prior art and, with the aid of transistors used as the active gain-producing elements, makes possible the realization of small compact central office and subscriber carrier terminals which require substantially no maintenance attention. Such carrier terminals are particularly suitable for use outside of the central telephone office at pole-mounted outdoor locations and for use on the actual subscriber premises.

In accordance with a principal feature of the present invention, the carrier terminal located at the central-office end of the transmission line is provided with both a modulator for carrier frequency oscillations, balanced to interrupt oscillations on alternate modulating signal half-cycles whenever the instantaneous amplitude of the modulating signal exceeds a predetermined level, and means to apply the low frequency ringing signals generated at the central office to the modulator at a level in excess of that predetermined level. This level is, as pointed out previously, many times greater than the level of the voice signals applied to the modulator during talking intervals. The carrier is thereby interrupted periodically in the presence of ringing signals, causing a series of short carrier pulses to be generated and transmitted out over the carrier line without the use of any relays or other switching equipment. The repetition rate of the ringing carrier pulses is the same as the applied ringing signal frequency.

At the other end of the carrier line, on the subscriber premises, the subscriber carrier terminal is, in accordance with a feature of the invention, provided with the combination of means to detect the short pulses of carrier transmitted from the office terminal, a bistable or flip-flop transistor circuit which is triggered between high and low output current states by the detected pulses, and a ringer operated by the high level output derived from the bistable circuit. The bistable circuit and ringer combination is sensitive to both the level and frequency of the pulses of carrier produced by a ringing signal rather than to the normally modulated carrier transmitted during talking intervals. In this manner, the pulses of carrier transmitted over the line from the office terminal to the subscribed terminal during ringing intervals are permitted to be of considerably lower power than is actually required to operate a ringer. Through the above-mentioned bistable or flip-flop transistor circuit, these carrier pulses, even though not much higher in level themselves than the normal voice-modulated carrier, control the much larger amounts of power needed to accomplish actual subscriber ringing.

From one important standpoint, the present invention may be regarded as permitting subscriber ringing information to be transmitted over the line fom the central office to the subscriber on a carrier frequency basis with a minimum of additional circuit components necessary over those already provided in the office and outlying carrier terminals for the transmission and reception of speech. The modulator which, as previously described, is balanced to interrupt the carrier periodically at the office terminal during alternate half-cycles of the central office generated ringing signals may be the same modulator that is provided to modulate the carrier with speech during talking intervals, while the detector which is connected to rectify the received ringing pulses of carrier at the subscriber terminal may be the same detector that is provided to demodulate the received wave during talking intervals. These necessary elements may, in this sense, be made to do double duty, permitting a maximum of simplicity, compactness, and freedom from maintenance difficulties to be achieved. As previously noted, when transistors are used as the active gain-producing elements, the office and subscriber carrier terminals in a subscriber-loop carrier telephone system embodying the invention are particularly suited for use at locations not conveniently accessible to maintenance personnel. The office carrier terminals, for example, in a system embodying the invention need not be located within the central office but may, if desired, be placed in an unattended location on the open wire line side of the central office entrance cable in order to avoid the loss which such a cable might introduce at carrier frequencies. Such terminals might either be pole mounted or mounted in a small unattended building on the outskirts of a town. The subscriber carrier terminals, on the other hand, may be located entirely on the subscriber's premises within a small bell box.

A more complete understanding of these and other features of the invention may be obtained from a study of the following detailed description of a specific embodiment.

Figure 1:
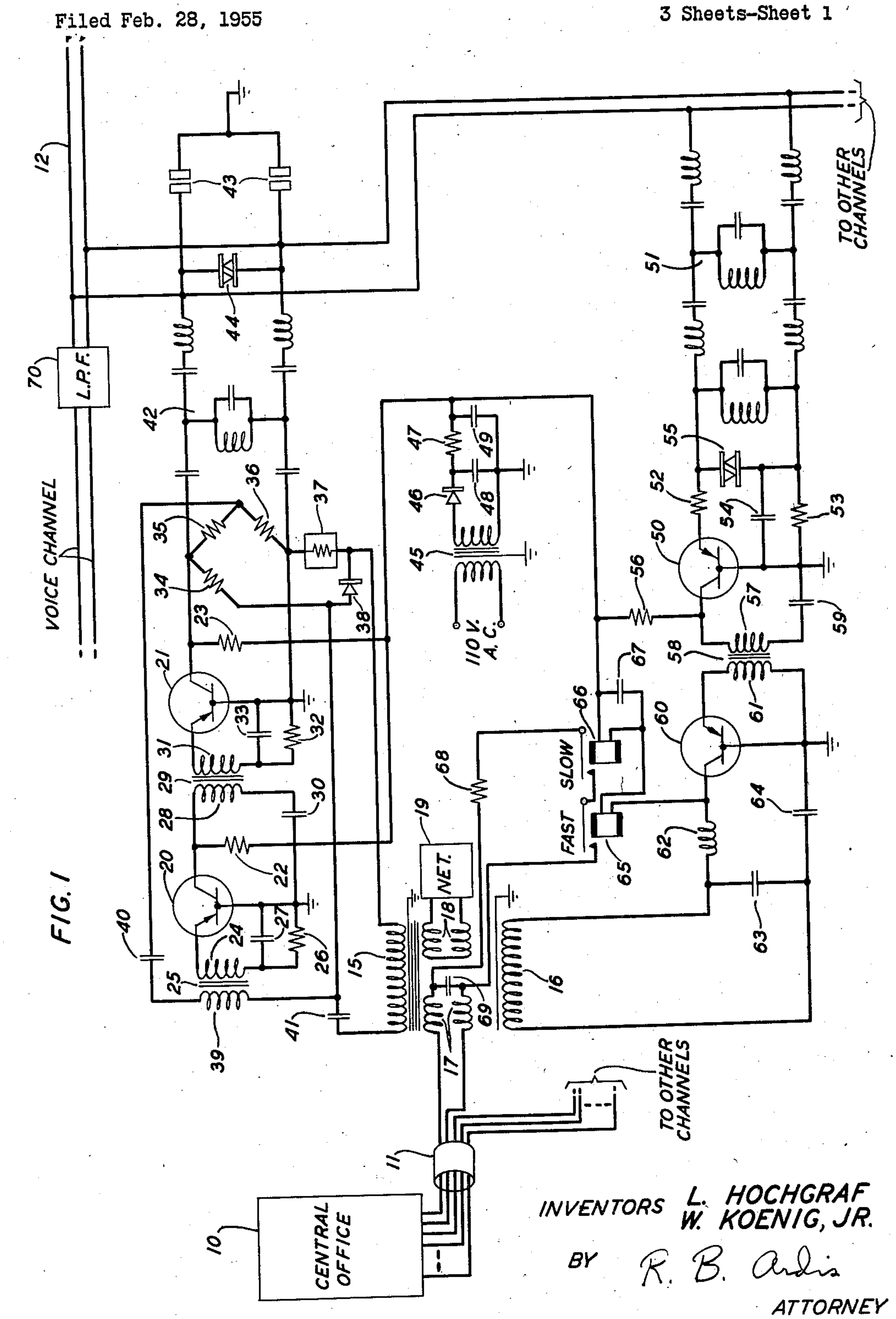
Fig. 1 is a schematic diagram of a central office carrier terminal forming part of a subscriber-loop carrier telephone system embodying the invention.
Figure 2:
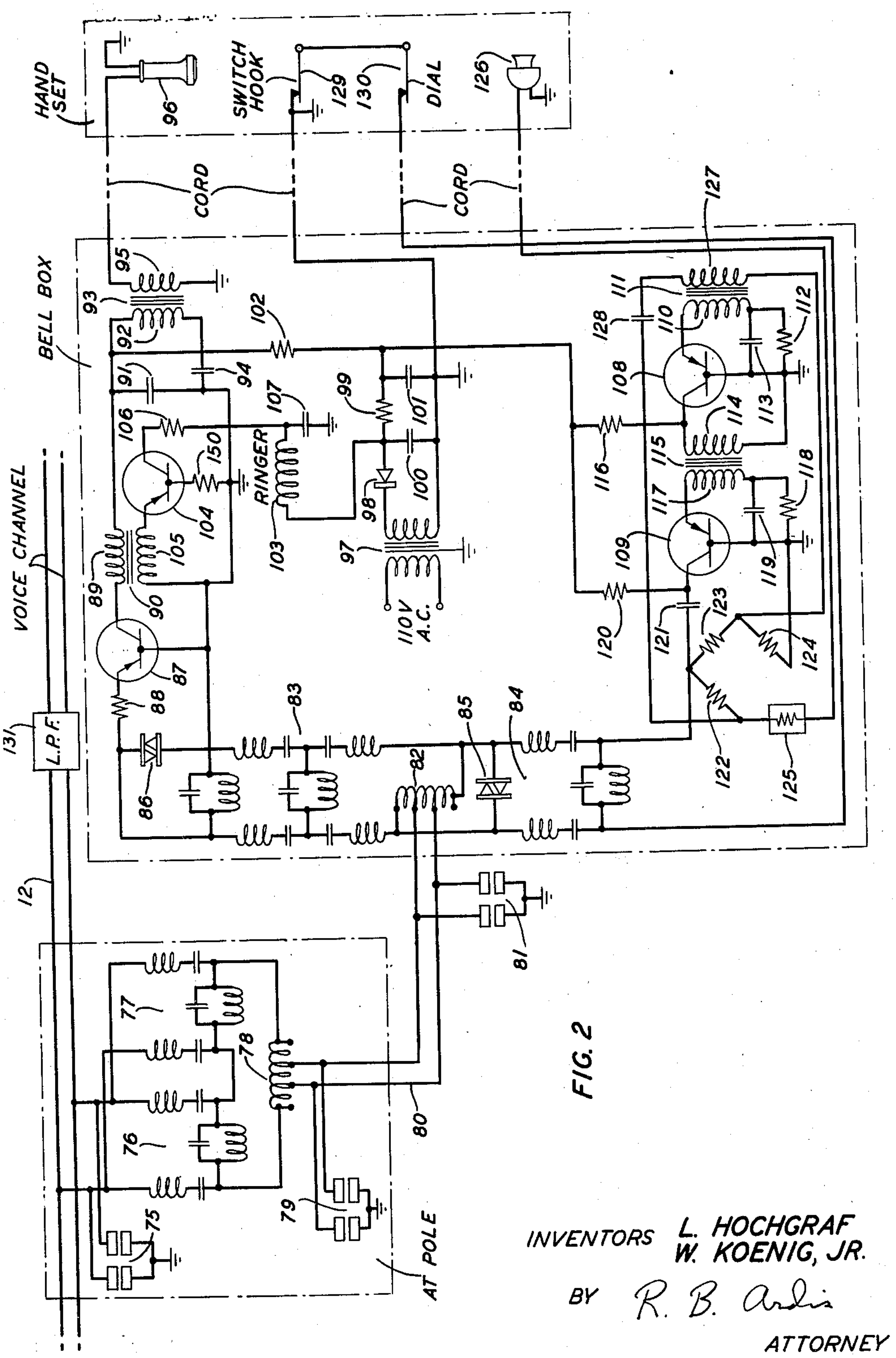
Fig. 2 is a schematic diagram of a subscriber carrier terminal forming part of a carrier telephone system embodying the invention.

A transistor subscriber-loop carrier telephone system embodying the invention which may be used to make a single transmission line intercoupling a scattered group of subscribers with a central office serve in place of a number of such lines is represented in Figs. 1 and 2. In the system shown, a separate "office" carrier terminal is used for each two-way carrier channel to modulate and demodulate outgoing and incoming signal waves. For the sake of simplicity, no provision is made for reverting calls, and each office carrier terminal is operatively associated with only one "subscriber" carrier terminal, removed from the office terminal at some distance along the carrier line. Full private-line service is provided to each subscriber in this manner. Each subscriber terminal also contains modulation and demodulation equipment for outgoing and incoming signal waves and is generally located with the subscriber station set on the subscriber premises. In addition to a plurality of carrier channels, the line may, of course, carry a single voice-frequency communication channel.

In Fig. 1, a standard central office 10 is shown connected by a suitable entrance cable 11 to one of several office carrier terminals. As indicated above, each office terminal contains the transmitting and receiving equipment for a single communication channel and may be connected between the entrance cable junction and an open wire carrier and voice-frequency transmission line 12. As is usual in carrier systems of this type, separate frequencies are used for opposite directions of transmission in each channel.

At the left-hand side of Fig. 1, one of the communication channels coming from central office 10 is coupled to a hybrid coil which is used to separate the two directions of transmission. The hybrid coil includes a transmitting winding 15, a receiving winding 16, and third and fourth common windings 17 and 18 which are used to couple the hybrid coil to the central office and to a balancing network 19, respectively.

The transmitting winding 15 of the hybrid coil is connected to a transistor amplitude-modulated oscillator which, in accordance with a feature of the invention, is particularly adapted for use for both speech transmission and subscriber ringing purposes. This oscillator is a two-stage transistor oscillator of the bridge-stabilized type and includes a first transistor 20 and a second transistor 21. The base electrodes of transistors 20 and 21 are both grounded, and their collector electrodes are returned through respective resistors 22 and 23 to a suitable reverse biasing voltage source. The emitter electrode of transistor 20 is returned to ground through the secondary winding 24 of a transformer 25 and an emitter biasing resistor 26 which is bypassed to ground by a condenser 27. The collector electrode of transistor 20 is returned to ground through the series combination of the primary winding 28 of a transformer 29 and a D.-C. blocking condenser 30. The emitter connections of transistor 21 are similar to those of transistor 20, the emitter being returned to ground through the series combination of the secondary winding 31 of transformer 29 and an emitter biasing resistor 32 which is bypassed to ground by a condenser 33.

Between the collector and base electrodes of transistor 21 is connected a four-terminal bridge circuit composed of three resistors 34, 35, and 36, a self-heated thermistor 37, and a copper-oxide varistor 38. Resistors 34, 35, and 36 constitute three arms of the bridge circuit while the series combination of thermistor 37 and varistor 38 make up the fourth. The series combination of resistors 35 and 36 is connected between the collector and base electrodes of transistor 21, as is the series combination of resistor 34, varistor 38, and thermistor 37. The junctions formed between resistors 34 and 35 and between resistor 36 and thermistor 37 are conjugate to those formed between resistors 35 and 36 and between resistor 34 and varistor 38. The latter two terminals are connected to a feedback path returning the output of transistor 21 to the input of transistor 20. This feedback path includes the primary winding 39 of transformer 25 and a condenser 40 which are connected in series between the last-mentioned pair of bridge terminals. Winding 39 and condenser 40 form a series resonant circuit at the desired transmitting carrier frequency.

Transmitting winding 15 of the hybrid coil is connected in series with a D.-C. blocking condenser 41 across varistor 38 in the transmitting modulator bridge circuit. Thermistor 37 stabilizes the output level of the oscillator and provides long term stability against changes in transistors, power supply, and other slow effects.

Resistors 34, 35, and 36, thermistor 37, and varistor 38 are arranged so that the feedback from the output of transistor 21 to the input of transistor 20 is positive for all expected levels of speech transmission. Varistor 38 and thermistor 37 are selected so that the resistance of their bridge arm is smaller than that of the other bridge arms at zero modulating signal input. As the instantaneous amplitude modulating signal input increases positively, the resistance of varistor 38 decreases, causing the bridge to become more unbalanced and the amount of signal fed back to the oscillator input to increase. The carrier oscillation level increases in a similar manner with a positive increase in modulating signal amplitude. When, on the other hand, the signal goes negative, amplitude increases cause the bridge unbalance to be reduced and the fed-back signal to reduce. The carrier oscillation level thereby decreases with each negative increase in modulating signal amplitude. At a predetermined level, many times higher than all possible levels of speech input, the resistance of the varistor arm of the bridge is so increased that the bridge balances and there is no longer any feedback to the input of transistor 20. Further negative increases in input signal amplitude unbalance the bridge in the opposite direction and cause the feedback to become negative. Under such conditions, carrier oscillations cease completely.

The output of the modulated carrier oscillator which has been described is taken between the collector and base electrodes of transistor 21 and is connected to carrier transmission line 12 through a band-pass filter 42. Protection of filter 42 and other similar components against large voltage surges on transmission line 12 caused by lightning or power induction is provided in the usual manner by carbon block protectors 43 connected between each side of the line and ground. Since existing carbon block protectors generally do not have sufficiently low breakdown voltages to protect transistors against transients which might be large enough to damage them, carbon block protectors 43 are supplemented by one or more varistors 44 connected directly across transmission line 12. These varistors may, for example, be of the copper-oxide or silicon diode type (in which case two oppositely poled units are connected in series across the line) or of silicon-carbide type (in which case a single unit is sufficient), limiting the transients to a suitably low value.

D.-C. power for both the transmitting modulator and the receiving apparatus in the office carrier terminal illustrated in Fig. 1 is provided by a power supply unit made up of transformer 45, a rectifier 46, a resistor 47, and a pair of condensers 48 and 49. The primary winding of transformer 45 is connected to a suitable A.-C. voltage source (e. g., 110 volt 60 cycle), while the secondary is connected in series with rectifier 46. The resistor 47 and condensers 48 and 49 form a smoothing filter between rectifier 46 and the elements to which the resulting D.-C. potential is applied.

The receiving circuit at the office terminal consists of one stage of carrier amplification followed by a detector. The carrier amplification is provided by a transistor 50 having its input connected through a band-pass channel filter 51 to transmission line 12. Transistor 50 has its base electrode grounded and its emitter electrode connected through a small resistor 52 to band-pass filter 51. A forward self-bias for the emitter electrode of transistor 50 is provided by a resistor 53 and a bypass condenser 54 connected in parallel between resistor 52 and ground. Supplemental lightning protection is provided for transistor 50 and all succeeding apparatus by one or more varistors 55 connected across the receiving circuit side of channel filter 51. Transistor 50 is supplied with a reverse collector bias by a resistor 56 connected to the previously described D.-C. power supply unit, while the primary winding 57 of an output transformer 58 is connected in series with a blocking condenser 59 between the collector electrode of transistor 50 and ground.

On the left-hand side of transistor 50, a transistor 60 operates as a detector. The secondary winding 61 of transformer 58 is connected between the emitter electrode of transistor 60 and ground, while the base electrode of transistor 60 is grounded. Since there is no bias on the emitter, transistor 60 acts as a half-wave rectifier. The carrier component of the output appearing in the collector circuit of transistor 60 is filtered out by the action of a series inductor 62 and a shunt condenser 63 which are connected between the collector circuit of transistor 60 and receiving winding 16 of hybrid coil 14. A D.-C. blocking condenser 64 is connected between filter condenser 63 and ground.

For signaling purposes, the office carrier terminal illustrated in Fig. 1 is provided with a pair of relays 65 and 66. The operating coils of relays 65 and 66 are connected in series between the collector electrode of transistor 60 and the ungrounded side of the office terminal D.-C. power supply. The operating coil of relay 66 is shunted by a condenser 67 to cause its action both on operate and release to be slower than that of relay 65. Winding 17 of the office terminal hybrid coil is divided into two portions, the end remote from network 13 of one being connected through a resistor 68 to the armature of slow relay 66 and the corresponding end of the other being connected directly to the contact of fast relay 65. The armature of fast relay 65 is connected directly to the contact of slow relay 66, and a D.-C. blocking condenser 69 is connected between the two halves of winding 17.

In the event that transmission line 12 carries a voice frequency channel as well as a number of carrier channels, a low-pass filter 70 may be connected, as shown in Fig. 1, in series with transmission line 12 to the left of the connection to the office carrier terminal to prevent carrier frequencies from being transmitted in that direction. The voice channel, however, extends beyond filter 70 and along transmission line 12 to both the right and the left of that point.

In the subscriber-loop carrier telephone system being described, one or more of the office carrier terminals illustrated in Fig. 1 can be located either on the central office premises or at some convenient distance removed therefrom. The number of office terminals used is, as pointed out above, dependent upon the number of carrier channels which it is desired to provide, while the distance of the terminals from the office is, in the example shown, dependent upon the length of the office entrance cable 11. If the added loss imposed by the entrance cable is acceptable in the carrier portion of the system, the office carrier terminals may be located on the central office premises and the channels transmitted through the entrance cable 11 on a carrier frequency basis.

Subscriber carrier terminals are, in the illustrated embodiment of the invention, located on each subscriber's premises. A small amount of filtering equipment is mounted on a convenient nearby pole at the line 12, but the modulation and demodulation apparatus is located indoors, within a small bell box near the subscriber's telephone set.

Fig. 2 illustrates one of the subscriber carrier terminals used in the system. At the upper left-hand corner of the figure is shown the pole-mounted coupling unit used to couple the transmission line 12 to the subscriber terminal. A pair of carbon block lighting protectors 75 (similar to the office terminal protectors 43 in Fig. 1) are connected between opposite sides of transmission line 12 and ground, and a pair of band-pass channel filters 76 and 77 are connected between transmission line 12 and a tapped, single-winding transformer 78. Tapped transformer 78 permits the use of either a long open wire drop of relatively high impedance or a twisted pair drop of relatively low impedance between the line pole and the subscriber's premises. A second pair of carbon block high-voltage protectors 79 are connected across the drop wire 80 on the subscriber side of transformer 78.

The bell box portion of the subscriber carrier terminal illustrated in Fig. 2 resembles the office carrier terminal in that it includes both transmitting and receiving apparatus. A pair of carbon block lightning protectors 81 on the drop wire side of the bell box provide primary high voltage protection for the subscriber terminal. Drop wire 80 itself is connected directly to appropriate taps on a tapped single-winding transformer 82 which matches it to another set of band-pass filters 83 and 84. Filter 83 leads from drop wire 80 to the receiving portion of the subscriber terminal while filter 84 leads to the transmitting portion. One or more varistors 84 (similar to varistors 44 in Fig. 1) are connected across transformer 82 to provide secondary high voltage protection in the manner described in connection with Fig. 1. Further secondary high voltage protection is provided by one or more varistors 86 connected across the end of band-pass filter 83 remote from transformer 82.

In the receiving portion of the subscriber terminal, illustrated in Fig. 2, a first transistor 87 acts as a detector in the same manner as transistor 60 in Fig. 1. The output from receiving band-pass channel filter 83 is applied between the emitter and base electrodes of transistor 87. A small resistor 88 is connected in series with the emitter electrode and the base electrode is grounded. As with transistor 60 in Fig. 1, there is no self-bias arrangement for the emitter electrode of transistor 87. The output from transistor detector 87 is taken between the collector and base electrodes and passed through a low-pass filter made up of a series inductor in the form of the primary winding 89 of a transformer 90 and a shunt condenser 91. The primary winding 92 of an audio-frequency transformer 93 is connected in series with a D.-C. blocking condenser 94 across filter condenser 91. The secondary winding 95 of audio transformer 93 is connected through the usual short telephone cord to the handset receiver 96.

Power is supplied to the subscriber terminal shown in Fig. 2 from the subscriber's own local supply. The primary winding of a 60-cycle power transformer 97 is connected to the subscriber's A.-C. outlet. A rectifier 98 is connected in series with the secondary winding of transformer 97 and the rectified output is smoothed by a filter composed of a series resistor 99 and a pair of shunt condensers 100 and 101. Condenser 100 is connected between rectifier 98 and the grounded side of the transformer secondary winding, while condenser 101 is returned to ground from the side of resistor 99 remote from rectifier 98. The ungrounded side of condenser 101 is connected through a series resistor 102 to the junction between winding 89 and filter condenser 91.

In the bell-box portion of the subscriber carrier terminal illustrated in Fig. 2, the ringer winding 103 is actuated by the output of a transistor 104. The base electrode of transistor 104 is connected to ground through a resistor 150 and the secondary winding 105 of transformer 90 is connected between the emitter electrode and ground. The collector electrode of transistor 104 is connected through a resistor 106 to one side of ringer winding 103, the other side of which is returned to the local D.-C. power supply at the junction of rectifier 98, resistor 99, and filter condenser 100. A by-pass condenser 107 is returned to ground from the junction between ringer winding 103 and resistor 106. Condenser 107 and winding 103 are tuned to the particular ringing frequency used.

The transmitting portion of the subscriber terminal includes a bridge-stabilized modulated transistor oscillator similar to the one used in the office carrier terminal shown in Fig. 1. The oscillator includes first and second transistors 108 and 109, the base electrodes of both of which are grounded. The emitter electrode of transistor 108 is returned to ground through the series combination of the secondary winding 110 of a transformer 111 and an emitter biasing resistor 112. A bypass condenser 113 is connected in parallel with resistor 112. The primary winding 114 of a transformer 115 is connected between the collector electrode of transistor 108 and ground, while the collector electrode is supplied with a reverse operating bias by a resistor 116 connected between it and the ungrounded side of power supply filter capacitor 101. The secondary winding 117 of transformer 115 is connected in series with a resistor 118 between the emitter electrode of transistor 109 and ground, with resistor 118 being bypassed by a condenser 119. The collector electrode of transistor 109 is returned to the ungrounded side of power supply filter capacitor 101 through a resistor 120.

In Fig. 2, two of the conjugate terminals of a four-terminal bridge circuit are connected between the collector and base electrodes of transistor 109, a D.-C. blocking condenser 121 being connected in series between the collector electrode and one of those terminals. The bridge itself is made up of resistors 122, 123, and 124, thermistor 125, and the telephone handset carbon microphone 126. Resistors 123 and 124 are connected in series between blocking condenser 121 and ground to form two arms of the bridge, and resistor 122 is connected in series between the same point and ground with thermistor 125 and carbon microphone 126. Resistor 122 constitutes the third arm of the bridge and the series combination of thermistor 125 and carbon microphone 126 the fourth. The bridge terminals conjugate to the ones connected across the output of transistor 109 are returned through a frequency selective feedback path to the intput side of transistor 108. The frequency selective path includes a series-resonant circuit composed of the primary winding 127 of transformer 111 and a condenser 128 connected from the junction between resistors 123 and 124 to the junction between resistor 122 and thermistor 125. The junction between resistors 122 and 123 is then connected to one side of band-pass filter 84. The other side of filter 84 is returned to ground through the switch-hook and dial relays 129 and 130 in the subscriber's telephone handset.

The modulated carrier oscillator formed by transistors 108 and 109 and shown at the bottom of Fig. 2 operates in substantially the same manner as the one shown in Fig. 1, with the exception that it is directly modulated by the handset carbon microphone 126 instead of by means of a varistor. Carbon microphone 126 is, in effect, a variable resistance modulated by voice. The resistance changes are very rapid in comparison with the action of thermistor 125 and serve to modulate the output level of the oscillator. With this arrangement, it is not necessary to provide a separate D.-C. power supply for the carbon microphone. This is a substantial saving since such a power supply, if provided, would probably be larger than that for all of the transistors in the subscriber terminal combined. If desired, a resistance may be connected either in series with microphone 126 or in shunt across it in order to prevent possible overmodulation by applied voice signals.

Other subscriber carrier terminals operating at other carrier frequencies may be coupled to transmission line 12 in the same manner as the one shown in Fig. 2. If it is desired to continue a voice channel carried by transmission line 12 on past the coupling unit for the subscriber carrier terminal, a low-pass filter 131 may be connected in series with the line in the manner shown in Fig. 2.

In the subscriber-loop carrier telephone system which has been described, both sides of the office carrier terminal equipment shown in Fig. 1 are energized at all times. Carrier is normally on in the outward or transmitting direction. When a subscriber is to be rung, the standard central dial office 10 supplies spurts of relatively high power 20-cycle ringing current over entrance cable 11 to the hybrid coil. Since transmission to the subscriber terminal is to be at carrier rather than voice frequencies, this ringing current cannot be transmitted directly over the carrier line. In many past subscriber-loop carrier telephone systems, relatively complex switching circuits have been provided to pulse the outgoing carrier under the control of this 20-cycle ringing current, and subscriber ringing has been accomplished at the subscriber end of the line under the control of the resulting carrier pulses. Such equipment, however, tends to be relatively complex and bulky and, if used in the system which has just been described, would tend to dissipate many of the advantages gained through the use of transistors instead of vacuum tubes in the sending and receiving circuits.

In accordance with a principal feature of the present invention, these disadvantages of the prior art are overcome by supplying the 20-cycle ringing currents from central office 10 directly to the transmitting modulator in the office terminal in the same manner as speech signals but at a level above the critical value specified previously in connection with the operation of the transmitting bridge-stabilized carrier oscillator. While all speech signals applied across varistor 38 in Fig. 1 change the level of carrier oscillation by increasing and decreasing the amount of resistance in the fourth bridge arm with the total resistance in that arm remaining in excess of that in any of the other arms, the 20-cycle ringing signals reduce the resistance of the varistor 38 arm of the bridge circuit below that of the remaining arms. On alternate half-cycles, signals thereby cause the bridge circuit to become unbalanced in the opposite direction and the signals fed back to the input of transistor 20 to be reversed in phase. In other words, ringing signals from central office 10 cause the feedback from the output of transistor 21 to the input of transistor 20 to become negative rather than positive, on alternate half-cycles, and the carrier oscillations to be periodically interrupted. This results in the production of a succession of carrier pulses having a repetition rate equal to the frequency of the ringing current and their transmission over the transmission line 12. When the ringing signal voltage is positive, positive feedback is applied and the oscillator puts out its maximum amplitude through substantially the entire half-cycle.

Figure 3:
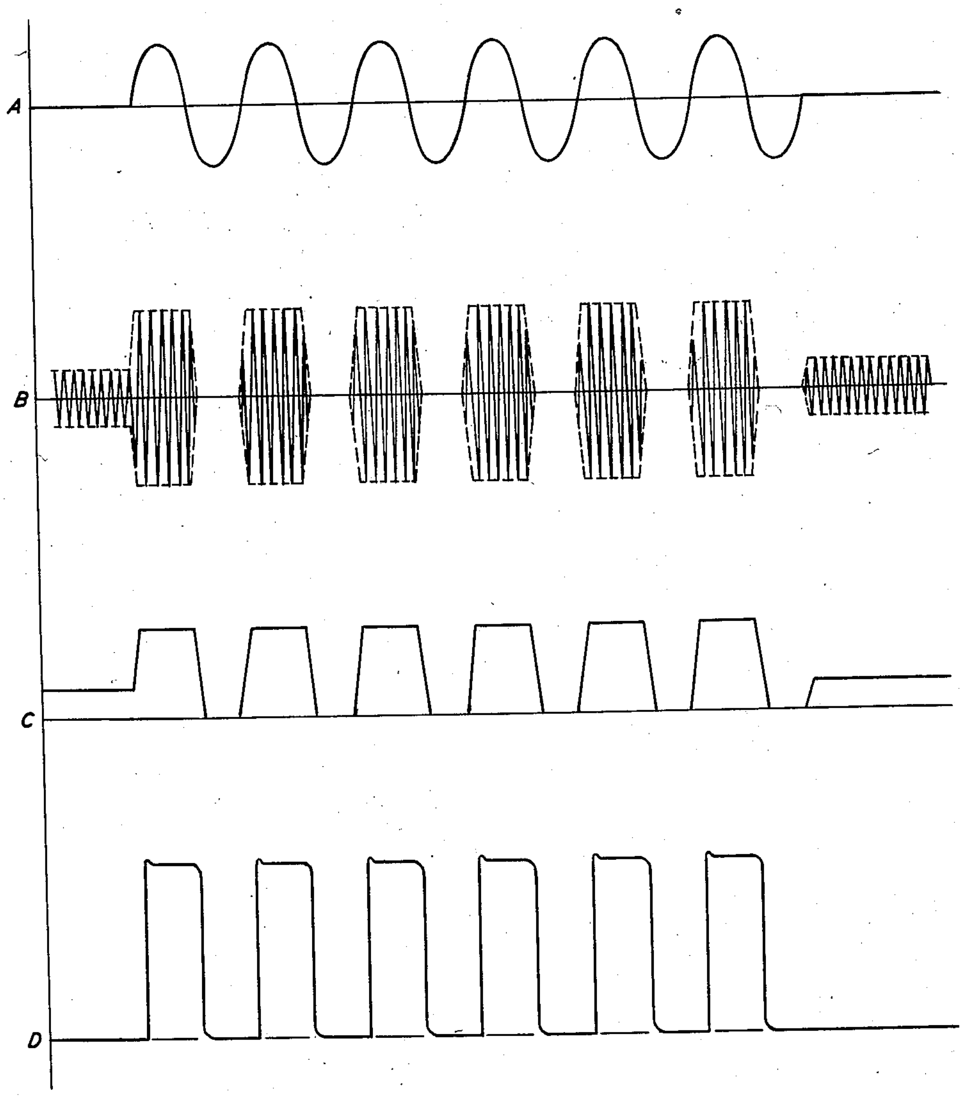
Fig. 3 shows a number of wave forms illustrating the principles of operation of the embodiment of the present invention shown in Figs. 1 and 2.

The operation of the features of the invention which have just been described is illustrated by the wave forms in lines A and B of Fig. 3. Line A of Fig. 3 shows a spurt of 20-cycle 90-volt ringing voltage generated by central office 10 which is applied through the office terminal hybrid coil to varistor 38. As shown in line B of Fig. 3, the carrier, which was previously at its normal unmodulated or reference level, is periodically interrupted and large pulses of carrier are generated during the positive half-cycles of ringing current. The carrier is completely shut off during most of each negative half-cycle, providing a series of separate and distinct ringing pulses of carrier for transmission over the line.

The carrier ringing pulses shown in line B of Fig. 3 are transmitted over carrier transmission line 12 to the subscriber terminal illustrated in Fig. 2. In the subscriber terminal, the receiving side is energized at all times and the pulses are detected by transistor 87, which is operated with no emitter bias. The detected ringing pulses are depicted in line C of Fig. 3. In the collector circuit of transistor 87, the resulting pulses are passed through transformer 90 to the emitter cicuit of trransistor 104. Transistor 104 forms a bistable circuit which can be triggered on and off by pulses of sufficient magnitude from winding 115 of transformer 90. When it is in the on condition, it conducts heavily in the collector circuit, and when it is in the off condition the collector current is substantially zero. The magnitude of the pulses required to trip the bistable circuit is greater than any produced by speech currents. This factor, in addition to the tuning provided by ringer winding 103 and condenser 107, assists in discriminating between speech and ringing signals. A mechanically tuned ringer may be used as an alternative if desired. The actual pulses serving to actuate ringer winding 103 are illustrated in line D of Fig. 3.

If desired, the transistor bistable circuit may be replaced by a magnetic amplifier arranged to give a snap action under the influence of a varying D.-C. input. Such an amplifier could be used to control pulses of 60-cycle current derived from the 60-cycle supply to operate the ringer. Ringer 103 plus condenser 107 would, however, still be selected to respond to pulses of the particular repetition rate provided.

If it is desired to provide multi-party instead of private-line service over a subscriber-loop carrier telephone system, it should be noted that the present invention is still applicable and still permits realization of the advantages which have been noted. Different ringing current frequencies generated by the control office may be used to produce corresponding different ringing-pulse repetition rates. The ringers at the respective subscriber terminals may be selected to respond to pulses of different repetition rates in the manner well known in the art.

The transmitting side of the subscriber carrier terminal shown in Fig. 2 is also energized at all times in order to save switch-hook contacts and avoid any necessity for bringing power into the telephone hand-set. The output side of the modulator circuit, however, is opened by the switch-hook so that carrier is transmitted toward the central office only when the receiver is lifted from the hook. At the office terminal this carrier, after being rectified by transistor 60, operates relays 65 and 66 to provide supervisory signals. Of the two relays shown, relay 66 is shunted by condenser 67 so that, as previously described, its action on both operate and release is slower than that of relay 65. This provides protection against false seizures by brusts of static. Once both relays have operated, the fast relay 65 responds to interruptions of the carrier made by the subscriber's dial relay 130 while the slow relay 66 remains closed. During dialing, the subscriber's dial relay 130 in Fig. 2 is alternately opened and closed, causing the carrier to be transmitted toward the central office in pulses. These dial pulses are detected by relays 65 and 66 in the office carrier terminal, in the manner that has just been described, and utilized in central office 10 in the conventional manner to operate central office switching equipment.

For connection to a manual central office, the dial circuit may be omitted from the subscriber terminal shown in Fig. 2, but relays 65 and 67 would still be required in the office terminal for supervisory purposes.

It is to be understood that the above-described arrangements are illustrative of the application of the principles of the invention. Numerous other arrangements may be devised by those skilled in the art without departing from the spirit and scope of the invention.

What is claimed is:

1. A carrier telephone system intercoupling a central office and at least one telephone subscriber which comprises, in combination, a transmission line, an office carrier terminal coupled to said line including a modulator for carrier frequency oscillations balanced to interrupt oscillations on alternate half-cycles of the modulating signal applied to its input in response to a modulating signal in excess of a predetermined amplitude level, a source of low frequency A.-C. ringing signals at said central office, means to apply said ringing signals to the input of said modulator at an amplitude level in excess of said predetermined level, whereby the carrier is periodically interrupted in the presence of ringing signals and a series of ringing pulses having a repetition rate equal to the ringing signal frequency is produced and transmitted over said line, and at least one subscriber carrier terminal coupled to said line at a location remote from said central office and including a demodulator for recovering modulated carrier frequency oscillations, a ringer, and means to operate said ringer under the control of said ringing pulses, whereby said ringer is operated whenever subscriber ringing signals are applied from said source at said central office to said modulator at said office carrier terminal.

2. A carrier telephone system intercoupling a central office an at least one telephone suscriber which comprises, in combination, a transmission line, and office carrier terminal coupled to said line including a modulator for carrier frequency oscillations balanced to interrupt oscillations on alternate half-cycles of the modulating signal applied to its input in response to a modulating signal in excess of a predetermined amplitude level, a source of low frequency A.-C. ringing signals at said central office, means to apply said ringing signals to the input of said modulator at an amplitude level in excess of said predetermined level, whereby the carrier is periodically interrupted in the presence of ringing signals and a series of ringing pulses having a repetition rate equal to the ringing signal frequency is produced and transmitted over said line, and at least one subscriber carrier terminal coupled to said line at a location remote from said central office and including a demodulator for recovering modulated carrier frequency oscillations, a ringer sensitive to low frequency A.-C. of the frequency of said ringing signals, and a bi-stable circuit having a high current state and a low current state coupled between said demodulator and said ringer, whereby said bi-stable circuit is triggered to its high current state in the presence of each of said ringing pulses and to its low current state during the intervals between ringing pulses and said ringer is operated whenever subscriber ringing signals are applied from said source at said central office to said modulator at said office carrier terminal.

3. A carrier telephone system in accordance with claim 2 in which said modulator is a modulated carrier frequency oscillator.

4. A carrier telephone system in accordance with claim 2 in which said modulator is a modulated bridge-stabilized carrier frequency oscillator.

5. A carrier telephone system intercoupling a central office and at least one telephone subscriber which comprises, in combination, a transmission line, an office carrier terminal coupled to said line including a modulated bridge-stabilized carrier oscillator in the form of an amplifier, a bridge circuit having one pair of conjugate terminals connected to the output side of said amplifier, a frequency-selective feedback path interconnecting the input side of said amplifier and the other pair of conjugate terminals of said bridge circuit, and means to change the balance of said bridge circuit under the control of a modulating signal applied thereto, said bridge being unbalanced to provide positive feedback in response to a modulating signal which is below a predetermined amplitude level on both positive and negative half-cycles and to provide negative feedback in response to a modulating signal which exceeds said predetermined amplitude level on one set of half-cycles, a source of low frequency A.-C. ringing signals at said central office, means to apply said ringing signals to said ridge circuit at a level at which both positive and negative half cycles have instantaneous amplitudes in excess of said predetermined level, whereby the carrier is periodically interrupted in the presence of ringing signals and a series of ringing pulses having a repetition rate equal to the ringing signal frequency is produced and transmitted over said line, and at least one subscriber carrier terminal coupled to said line at a location remote from said central office and including a demodulator for recovering modulated carrier frequency oscillations, a ringer, and means to operate said ringer under the control of said ringing pulses, whereby said ringer is operated whenever subscriber ringing signals are applied from said source at said central office to said modulator at said office carrier terminal.

6. A carrier telephone system intercoupling a central office and at least one telephone subscriber which comprises, in combination, a transmission line, an office carrier terminal coupled to said line including a modulated bridge-stabilized carrier oscillator in the form of an amplifier, a bridge circuit having one pair of conjugate terminals connected to the output side of said amplifier, a frequency-selective feedback path interconnecting the input side of said amplifier and the other pair of conjugate terminals of said bridge circuit, and means to change the balance of said bridge circuit under the control of a modulating signal applied thereto, said bridge being balanced to provide positive feedback in a response to a modulating signal which is below a predetermined amplitude level on both positive and negative half-cycles and to provide negative feedback in a response to a modulating signal which exceeds said predetermined level on one set of half-cycles, a source of low frequency A.-C. ringing signals at said central office, means to apply said ringing signals to said bridge circuit at a level at which the half-cycles of said one set have instantaneous amplitudes in excess of said predetermined level, whereby the carrier is periodically interrupted in the presence of ringing signals and a series of ringing pulses having a repetition rate equal to the ringing signal frequency is produced and transmitted over said line, and at least one subscriber carrier terminal coupled to said line at a location remote from said central office and including a demodulator for recovering modulated carrier frequency oscillations, a ringer sensitive to low frequency A.-C. of the frequency of said ringing signals, and a bi-stable circuit having a high current state and a low current state coupled between said demodulator and said ringer, whereby said bi-stable circuit is triggered to its high current state in the presence of each of said ringing pulses and to its low current state during the intervals between ringing pulses and said ringer is operated whenever subscriber ringing signals are applied from said source at said central office to said modulator at said office carrier terminal.

7. In a carrier telephone system intercoupling a central office and a plurality of telephone subscribers, a transmission line, an office carrier terminal coupled to said line including a modulator for carrier frequency oscillations balanced to interrupt oscillations on alternate half-cycles of the modulating signal applied to its input in a response to a modulating signal having an amplitude in excess of a predetermined level, a source of low frequency A.-C. ringing signals at said central office, and means to apply said ringing signals to the input of said modulator at a level in excess of said predetermined level, whereby the carrier is periodically interrupted in the presence of ringing signals and a series of ringing pulses having a repetition rate equal to the ringing signal frequency is produced and transmitted over said line.

8. In a carrier telephone system intercoupling a central office and a plurality of telephone subscribers, a transmission line, an office carrier terminal coupled to said line including a modulated bridge-stabilized carrier oscillator in the form of an amplifier, a bridge circuit having one pair of conjugate terminals connected to the output side of said amplifier, a frequency-selective feedback path interconnecting the input side of said amplifier and the other pair of conjugate terminals of said bridge circuit, and means to change the balance of said bridge circuit under the control of a modulating signal applied thereto, said bridge being unbalanced to provide positive feedback in a response to a modulating signal having an instantaneous amplitude below a predetermined level on both positive and negative half-cycles and to provide negative feedback in response to a modulating signal having an instantaneous amplitude on one set of half-cycles which exceeds said predetermined level, a source of low frequency A.-C. ringing signals at said central office, means to apply said ringing signals to said bridge circuit at a level at which the half-cycles of said set have instantaneous amplitudes in excess of said predetermined level, whereby the carrier is periodically interrupted in the presence of ringing signals and a series of ringing pulses having a repetition rate equal to the ringing signal frequency is produced and transmitted over said line.

No references cited.